US005506745A

United States Patent [19]

Litman

[11] Patent Number: 5,506,745

[45] Date of Patent: Apr. 9, 1996

[54] HOLLOW CONFORMABLE CHARGE ROLL

[75] Inventor: Alan M. Litman, Webster, N.Y.

[73] Assignee: Xerox Corporation, Stamford, Conn.

[21] Appl. No.: 286,353

[22] Filed: Aug. 5, 1994

[51] Int. Cl.$^6$ .............................. H01G 3/00

[52] U.S. Cl. .............................. 361/225; 355/219

[58] Field of Search .............................. 355/219, 277, 355/274; 361/225; 492/4, 5, 18

[56] References Cited

U.S. PATENT DOCUMENTS

| | | | |
|---|---|---|---|
| 2,807,233 | 9/1957 | Fitch | 118/637 |
| 3,210,826 | 10/1965 | Connelly | 492/18 |
| 3,697,836 | 10/1972 | Moss et al. | 317/262 A |
| 3,702,482 | 11/1972 | Dolcimascolo et al. | 346/74 ES |
| 4,227,797 | 10/1980 | Tsunoi | 355/256 |
| 4,309,803 | 1/1982 | Blaszak | 492/53 |
| 4,553,296 | 11/1985 | Eibe | 492/4 |
| 4,974,782 | 12/1990 | Nelson | 492/53 X |
| 5,012,072 | 4/1991 | Martin et al. | 219/469 |
| 5,017,965 | 5/1991 | Hashimoto et al. | 355/219 |
| 5,081,496 | 1/1992 | Takeda | 355/215 |
| 5,095,335 | 3/1992 | Watanabe et al. | 355/210 |
| 5,112,708 | 5/1992 | Okunuki et al. | 430/31 |
| 5,126,913 | 6/1992 | Araya et al. | 361/225 |
| 5,132,738 | 7/1992 | Nakamura et al. | 355/274 |
| 5,140,371 | 8/1992 | Ishihara et al. | 355/219 |
| 5,148,219 | 9/1992 | Kohyama | 355/219 |
| 5,276,490 | 1/1994 | Bartholmae et al. | 355/274 |

FOREIGN PATENT DOCUMENTS

| | | |
|---|---|---|
| 0208879 | 8/1988 | Japan . |
| 0208278 | 7/1994 | Japan . |

OTHER PUBLICATIONS

R. M. Schaffert, "Electrophotography"; The Focal Press; pp. 26, 39.

*Primary Examiner*—Robert Beatty
*Attorney, Agent, or Firm*—John S. Wagley

[57] ABSTRACT

A device for charging a member. The device includes a roller contactable with the member to charge the member. The roller includes an elongated cylinder defining a central cavity in the elongated cylinder. The cylinder is flexible in a radial direction toward the central cavity. The device also includes an electrical biaser for electrically biasing the roller.

14 Claims, 8 Drawing Sheets

HOLLOW CONFORMABLE CHARGE ROLL

The present invention relates to a method and apparatus for charging a surface. More specifically, the invention relates to a contact type charging device for charging a surface in an electrostatographic copy or printing machine.

The features of the present invention are useful in the printing arts and more particularly in electrophotographic printing. In the process of electrophotographic printing, a photoconductive surface is charged to a substantially uniform potential. The photoconductive surface is image wise exposed to record an electrostatic latent image corresponding to the informational areas of an original document being reproduced. This records an electrostatic latent image on the photoconductive surface corresponding to the informational areas contained within the original document. Thereafter, a developer material is transported into contact with the electrostatic latent image in a region known as the development zone. Toner particles are attracted from beads of the developer material onto the latent image. The resultant toner powder image is then transferred from the photoconductive surface to a copy sheet and permanently affixed thereto. The foregoing generally describes a typical mono-color electrophotographic copying machine.

To charge the surface of a photoreceptor as well as to detach a copy sheet or to preclean the photoreceptor, a corotron or scorotron with a wire electrode and a shielded electrode is commonly used.

The use of a corotron or scorotron presents several problems including a requirement for an expensive high voltage source. The high voltage source requires a large space due to the structure of the corotron or scorotron and due to shielding of the high voltage source as well as the inherent size of the high voltage source itself. Further, the use of a corotron or scorotron results in the generation of a large amount of ozone. Ozone is believed by some to be a detrimental contributing factor to long term temperature changes and therefore equipment is required in many copy machines and printers to contain the ozone therewithin.

Recently, a contact type charging device has been used in place of the corotron or scorotron involving the above problems. The contact type charging device includes a conductive member such as a contactable charging member which is supplied from a power source with a voltage which is a d.c. voltage of approximately 1 to 2 kv. The power source may include superimposed a.c. and d.c. voltages. The charging device contacts the image bearing member surface which is a member to be charged. The contact type charging device charges the image bearing member to a predetermined potential. Typically the contact type charger is in the form of a roller type charger such as that disclosed in U.S. Pat. No. 4,387,980, herein incorporated by reference.

In contact type charging systems, it is important that the charging member contacts the image bearing member uniformly along the length thereof. Contact charge type rollers, therefore, typically include a conformable material to maintain the contact with the photoconductive member.

Referring to FIG. 3, a prior art conformable contact type charging roller 10 is shown. The charging roller 10 includes a shaft 12 typically with a cylindrical cross section which extends along the length of the roller 10. The shaft 12 is preferably made from a conductive material such as a metal. A conformable foam coating 14 surrounds the shaft 12 and provides the conformable feature of the charging roller 10. The foam coating 14 preferably has a conductivity less than that of the shaft 12. The foam coating 14 is made of a synthetic material such as urethane foam. A surface layer 16 surrounds the foam coating 14. The surface layer 16 also has an electrical conductivity less than that of the shaft 12 and the conductivity of the surface layer 12 is chosen to optimize the charging of the photoconductive member. The surface layer 16 is made of a suitable material such as a plastic. Preferably, ends 18 of the shaft 12 extend beyond the ends of the charging roller 10 and provide support means for the charging roll 10 as well as to provide a portion of the shaft 12 to make the electrical connection to the charging roll power supply (not shown).

The prior art charging device, while providing adequate service, is expensive to manufacture. The prior art charging roll is made from several materials and is manufactured in a series of manufacturing steps. Since each copier or printer may include not only a charging device but a similar bias transfer roll to transfer the developed image to the copy paper from the photoreceptor as well as a similar precleaning charging device, the cost of the expensive charging devices can be substantial.

The following disclosures may be relevant to various aspects of the present invention:

U.S. Pat. No. 5,140,371
Patentee: Ishihara, et al.
Issue Date: Aug. 18, 1992

U.S. Pat. No. 5,112,708
Patentee: Okunuki, et al.
Issue Date: May 12, 1992

U.S. Pat. No. 5,095,335
Patentee: Watanabe, et al.
Issue Date: Mar. 10, 1992

U.S. Pat. No. 5,081,496
Patentee: Takeda
Issue Date: Jan. 14, 1992

U.S. Pat. No. 5,017,965
Patentee: Hashimoto, et al.
Issue Date: May 21, 1991

U.S. Pat. No. 5,012,072
Patentee: Martin, et al.
Issue Date: Apr. 30, 1991

U.S. Pat. No. 3,702,482
Patentee: Delcimascolo, et al.
Issue Date: Nov. 7, 1972

U.S. Pat. No. 3,697,836
Patentee: Moss, et al.
Issue Date: Oct. 10, 1972

U.S. Pat. No. 2,807,233
Patentee: C. J. Fitch
Issue Date: Sep. 24, 1957

"Electrophotography"
R. M. Schaffert
The Focal Press
London and New York
1965
Pages 26 and 39

U.S. Pat. No. 5,140,371 discloses a roll-like contact charging member that is designed to come into contact with a photosensitive drum. The member includes a metal core of 6 mm diameter, a conductive layer and a protective layer with a thickness of 10 to 100 microns. The member has an outer diameter of 12 mm.

U.S. Pat. No. 5,112,708 discloses an electrophotographic device including a member for charging and an electrophotographic photosensitive member arranged in contact with the member for charging. The member consists of a cylindrical metal core material, the core material is coated by an electroconductive polymer. The polymer is coated with an electroconductive powder with a resistivity higher than the polymer coating.

U.S. Pat. No. 5,095,335 discloses a roller type contact charging member with a metal shaft and a resin or rubber layer. A supporting member supporting the charging member is retractable from a first position contacting the image bearing member to a second position spaced from the image bearing member.

U.S. Pat. No. 5,081,496 discloses a charging roller with a charging layer having a two layer coating configuration. The charging roller includes a metal mandrel coated with a layer of elastic rubber and is further coated with a layer of carbon dispersed urethane rubber.

U.S. Pat. No. 5,017,965 discloses a charging roller having a surface layer which comprises a polyurethane resin. The charging roller includes an electroconductive substrate, a base layer, and a surface layer. The substrate may be either an electroconductive resin or a metal.

U.S. Pat. No. 5,012,072 discloses a fusing apparatus including a heater roll is disposed transverse to the direction of movement of the support material, the heater roll is stiffened in the longitudinal direction by a plurality of ribs between an inner and an outer ring.

U.S. Pat. No. 3,702,482 discloses a biased transfer roll with a conductive metal core made of a material such as aluminum. Over the core is placed a thick intermediate elastomeric material. Over the intermediate elastomeric material is placed thin coating of elastomeric material.

U.S. Pat. No. 3,697,836 discloses an electrostatic copying assembly including a pair of adjacent, parallel and oppositely driven rolls. One of which has a radially outer portion of fired silicate clay base ceramic material which is doped with iron oxides and a radially inner portion of conductive material to form part of the charging circuit.

U.S. Pat. No. 2,807,233 discloses a transfer roller supported by shaft. The transfer roller includes an inner metallic portion and an outer portion of very resilient or yielding material having a high electrical resistance such as soft semi-conductive rubber.

Electrophotography discloses the use of electrically conductive or semi-conductive rubber rollers to transfer an electrostatic charge to a xerographic plate.

In accordance with one aspect of the present invention, there is provided a device for charging a member. The device includes a roller contactable with the member to charge the member. The roller includes an elongated cylinder defining a central cavity therein. The cylinder is flexible in a radial direction toward the central cavity. The device also includes an electrical biaser for electrically biasing the roller.

In accordance with another aspect of the present invention, there is provided a printing machine of the type having a visible image formed on a receiving medium. The machine includes a roller contactable with the receiving medium to charge the receiving medium. The roller includes an elongated cylinder defining a central cavity therein. The cylinder is flexible in a radial direction toward the central cavity. The machine also includes an electrical biaser for electrically biasing the roller.

In accordance with a further aspect of the present invention, there is provided a method of manufacturing a charging roller for use in charging a surface, including the step of molding a material to form a first electrically conductive cylinder defining a first cavity therein, a second elongated cylinder located within the first cavity and defining a second cavity therein, and a rib interconnecting the first and the second cylinders.

In accordance with a further aspect of the present invention, there is provided a method of manufacturing a roller for use in charging a surface. The method includes the step of molding a material to form a electrically conductive cylinder having a central cavity.

BRIEF DESCRIPTION OF THE DRAWINGS

The invention will be described in detail herein with reference to the following figures in which like reference numerals denote like elements and wherein.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 6:
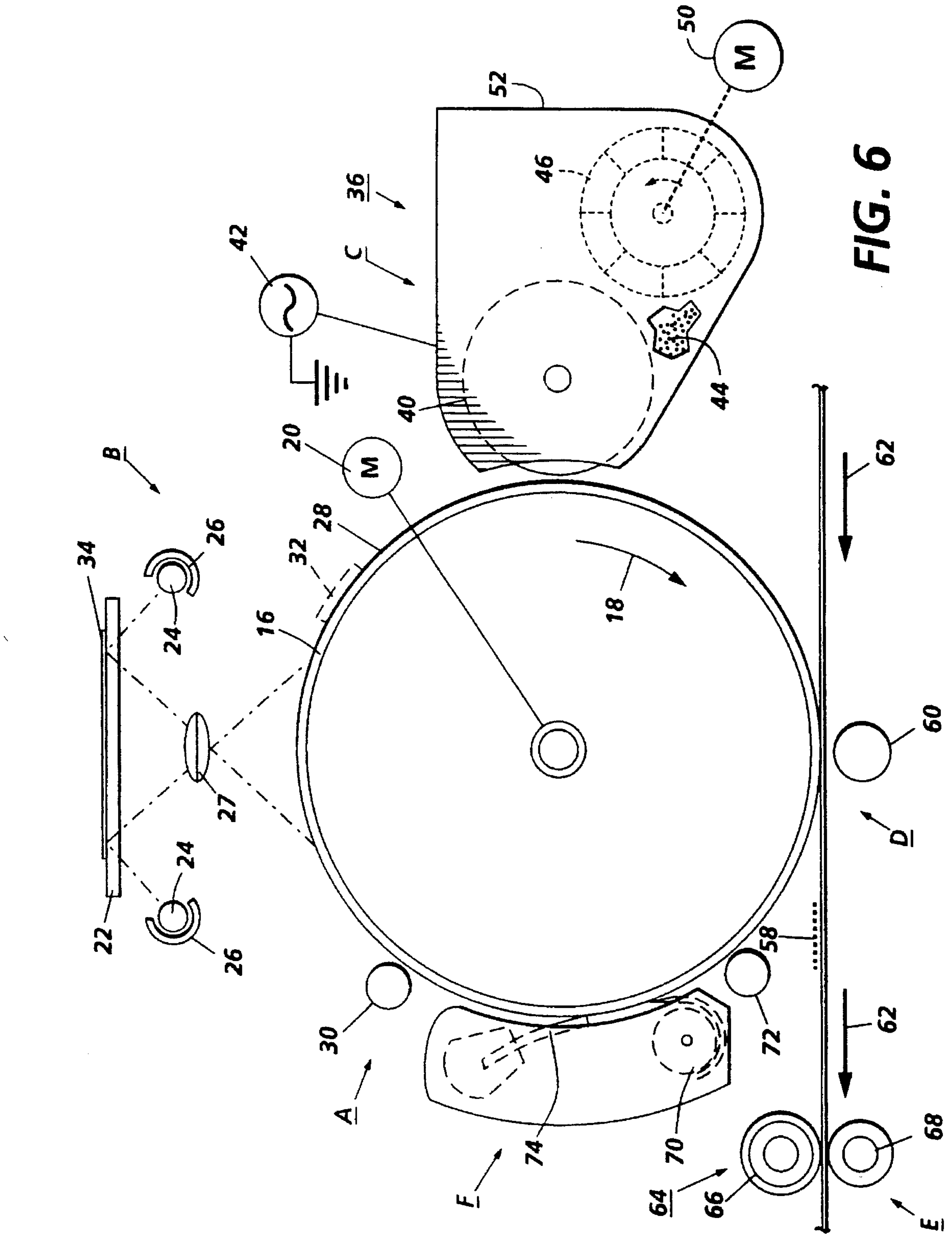
FIG. 6 is a schematic elevational view of an illustrative electrophotographic printing machine incorporating the charging roll of the present invention therein.

For a general understanding of the illustrative electrophotographic printing machine incorporating the features of the present invention therein, reference is made to the drawings. In the drawings, like reference numerals have been used throughout to designate identical elements. FIG. 6 schematically depicts the various components of an electrophotographic printing machine incorporating the charging roll of the present invention therein. Although the charging roll of the present invention are particularly well adapted for use in the illustrative printing machine, it will become evident that these charging rolls are equally well suited for use in a wide variety of printing machines and are not necessarily limited in their application to the particular embodiments shown herein.

Referring now to FIG. 6, the electrophotographic printing machine shown employs a photoconductive drum 16, although photoreceptors in the form of a belt are also known, and may be substituted therefor. The drum 16 has a photoconductive surface deposited on a conductive substrate. Drum 16 moves in the direction of arrow 18 to advance successive portions thereof sequentially through the various processing stations disposed about the path of movement thereof. Motor 20 rotates drum 16 to advance drum 16 in the direction of arrow 18. Drum 16 is coupled to motor 20, by suitable means such as a drive.

Initially successive portions of drum 16 pass through charging station A. At charging station A, a charging device, such as in the form of a charging roll, indicated generally by the reference numeral 30, charges the drum 16 to a selectively high uniform electrical potential. The electrical potential is normally opposite in sign to the charge of the toner. Depending on the toner chemical composition, the potential may be positive or negative. Any suitable control, well known in the art, may be employed for controlling the charging roller 30.

A document 34 to be reproduced is placed on a platen 22, located at imaging station B, where it is illuminated in a known manner by a light source such as a lamp 24 with a photo spectral output matching the photo spectral sensitivity of the photoconductor. The document thus exposed is imaged onto the drum 16 by a system of mirrors (not shown), reflectors 26 and lens 27, as shown. The optical image selectively discharges surface 28 of the drum 16 in an image configuration whereby an electrostatic latent image 32 of the original document is recorded on the drum 16 at the imaging station B.

At development station C, a magnetic brush development system or unit, indicated generally by the reference numeral 36 advances developer materials into contact with the electrostatic latent images. Preferably, the magnetic developer unit includes a magnetic developer roller mounted in a housing. Thus, developer unit 36 contains a magnetic roller 40. The roller 40 advances developer material into contact with the latent image. Appropriate developer biasing is may be accomplished via power supply 42, electrically connected to developer unit 36.

The developer unit 36, in the direction of movement of drum 16 as indicated by arrow 18, develops the charged image areas of the photoconductive surface. This developer unit contains black developer, for example, material 44 having a triboelectric charge such that the black toner is urged towards charged areas of the latent image by the electrostatic field existing between the photoconductive surface and the electrically biased developer rolls in the developer unit which are connected to the bias power supply 42.

To assist in the mixing of new toner with the developer material 44 in the developer unit 36 and to assist in the triboelectric charging of the developer material 44, the developer unit includes a mixing auger 46. The mixing auger 46 may be located in a lower portion of the unit 36 and extends along the length of the unit 36. The mixing auger 46 may be driven by any suitable means such as by an electrical motor 50, either being directly connected to the motor 50 or indirectly connected with drive elements such as gears or belts. It should also be appreciated that the auger 46 may likewise be driven by motor 20 with appropriate drive elements. The mixing auger 46 is secured to the developing unit in any suitable manner such as by being supported by the developer housing 52.

A sheet of support material 58 is moved into contact with the toner image at transfer station D. The sheet of support material 58 is advanced to transfer station D by conventional sheet feeding apparatus, not shown. Preferably, the sheet feeding apparatus includes a feed roll contacting the uppermost sheet of a stack of copy sheets. Feed rolls rotate so as to advance the uppermost sheet from the stack into a chute which directs the advancing sheet of support material into contact with the photoconductive surface of drum 16 in a timed sequence so that the toner powder image developed thereon contacts the advancing sheet of support material at transfer station D.

Transfer station D includes a charging device, such as in the form of a biased transfer roll, indicated generally by the reference numeral 60 which sprays ions of a suitable polarity onto the backside of sheet 58. This attracts the toner powder image from the drum 16 to sheet 58. The electrical potential is normally opposite in sign to the charge of the toner. Depending on the toner chemical composition, the potential may be positive or negative. Any suitable control, well known in the art, may be employed for controlling the biased transfer roll 60. After transfer, the sheet continues to move, in the direction of arrow 62, onto a conveyor (not shown) which advances the sheet to fusing station E.

Fusing station E includes a fuser assembly, indicated generally by the reference numeral 64, which permanently affixes the transferred powder image to sheet 58. Preferably, fuser assembly 64 comprises a heated fuser roller 66 and a pressure roller 68. Sheet 58 passes between fuser roller 66 and pressure roller 68 with the toner powder image contacting fuser roller 66. In this manner, the toner powder image is permanently affixed to sheet 58. After fusing, a chute, not shown, guides the advancing sheet 58 to a catch tray, also not shown, for subsequent removal from the printing machine by the operator. It will also be understood that other post-fusing operations can be included, for example, binding, inverting and returning the sheet for duplexing and the like.

After the sheet of support material is separated from the photoconductive surface of drum 16, the residual toner particles carried by image and the non-image areas on the photoconductive surface are charged to a suitable polarity and level by a preclean charging device 72, such as a charging roller, to enable removal therefrom. These particles are removed at cleaning station F. The cleaning station F includes an electrostatic, fur brush cleaner unit 70 as well as a blade 74. The fur brush cleaner unit 70 rotates at relatively high speeds which creates mechanical forces that tend to sweep the residual toner particles into an air stream, and then into a waste container. Subsequent to cleaning, a discharge lamp or corona generating device (not shown) dissipates any residual electrostatic charge remaining prior to the charging thereof for the next successive imaging cycle.

It is believed that the foregoing description is sufficient for purposes of the present application to illustrate the general operation of an electrophotographic printing machine incorporating the development apparatus of the present invention therein.

Figure 1B:
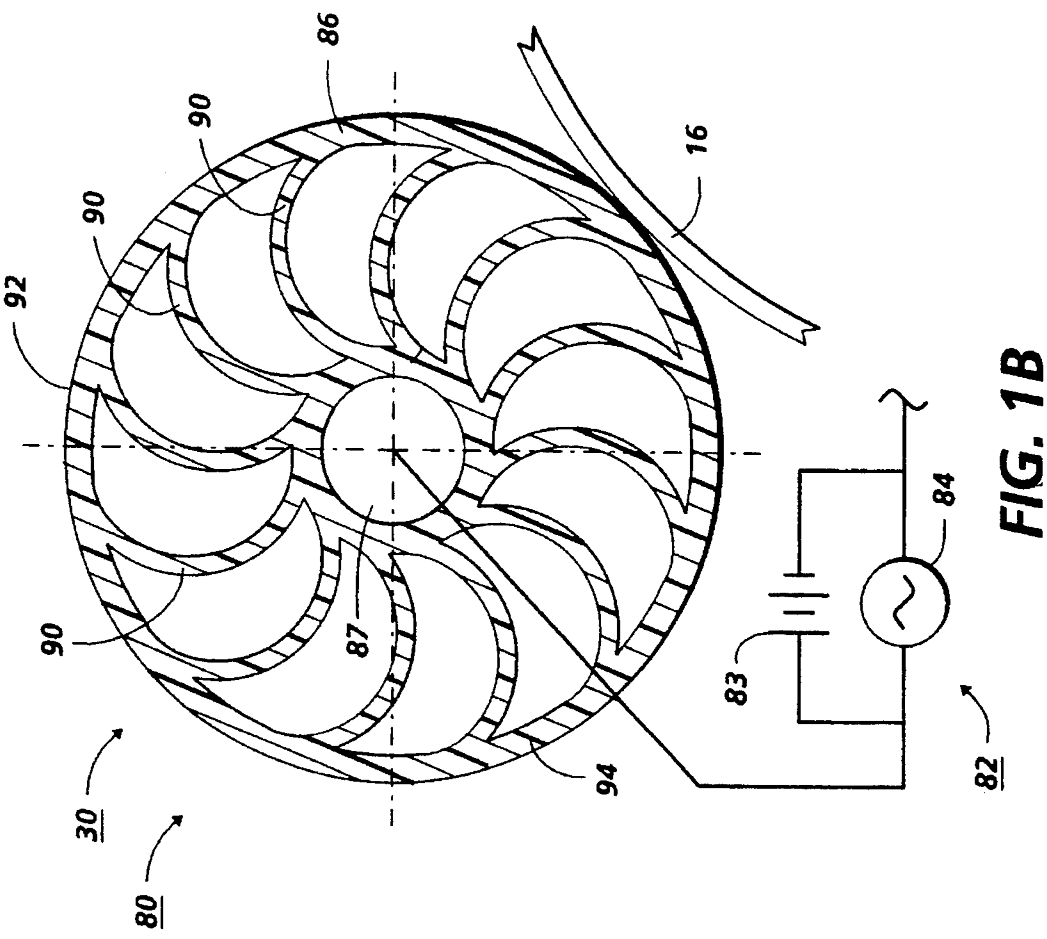
FIG. 1B is a sectional view taken along the line in the direction of the arrows 1B—1B of FIG. 1A.
Figure 1A:
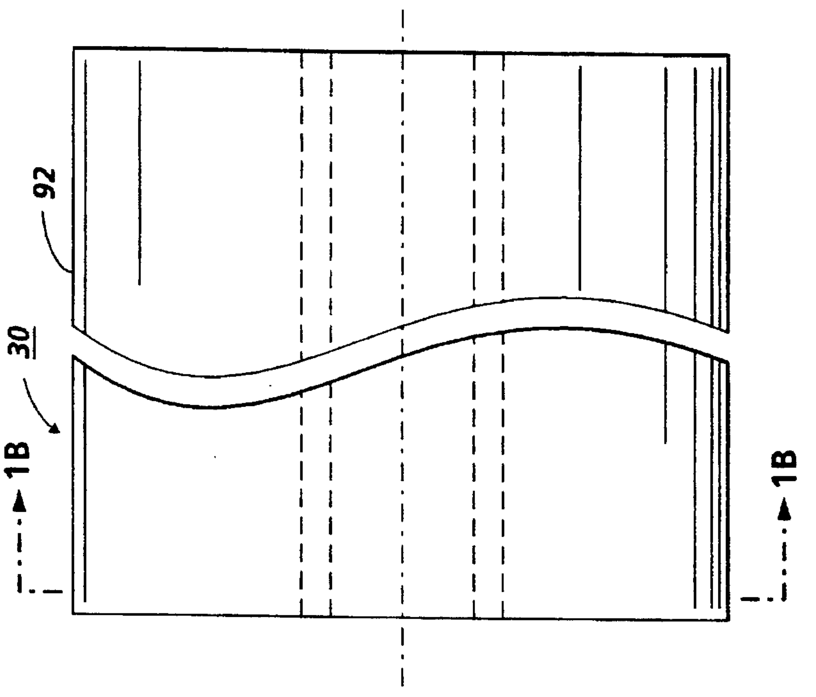
FIG. 1A is a plan view of a first embodiment of the charging roll of the present invention.

Now, referring to FIGS. 1A and 1B, charging device 80 is shown incorporating the charging roller 30 of the present invention therein. Charging device 80 as shown in FIG. 1B includes the charging roller 30 which is electrically connected to a power source 82. Power source 82 may be any conventional power source and typically will include a d.c. voltage of approximately 1,000 to 2,000 volts. Preferably, the d.c. voltage source 82 includes a direct current power supply 83 superimposed upon an a.c. power supply 84. The charging roller 30 includes a conformable body 86 which defines a central cavity 87 therein. The conformable body 86 and the central cavity 87 cooperate to provide the charging roller 30 with sufficient conformability to provide constant contact of the charging roller 30 to the photoconductive drum 16 (see FIG. 6).

Again referring to FIG. 1B, the conformable body 86 preferably includes an inner elongated cylinder 88 which includes the central cavity 87 therein, ribs 90 extend outwardly, preferably the ribs 90 have an arcuate shape to provide strength and flexibility. For example the ribs 90 may be as shown in a spiral pattern. The ribs 90 extend from the inner elongated cylinder 88 to an outer elongated cylinder 92. The conformable body 86 of the charging roll 30 is preferably made of a suitable material, such as a plastic, with properties and dimensions chosen to obtain the suitable conformability of the charging roller 30 against the drum 16. To provide suitable conductivity of the charging roller 30, the conformable body 86 may include conductive material 94 such as carbon black. To provide the inner elongated cylinder 88 with a higher conductivity than either the ribs 90 or the outer elongated cylinder 92, the inner elongated cylinder 88 may include a higher propensity of the conductive material 94 than either the ribs 90 of the outer elongated cylinder 92. The charging roller 30 as shown in FIGS. 1A and 1B may be made by any suitable process such as by extrusion or by molding. The material of the conformable body 86 of the charging roll 30 should be chosen to obtain the sufficient wear, conductivity, insulative and other properties required for a suitable charging roller 30. The charge roller 30, being made from single or multiple materials in a single process, can be manufactured inexpensively.

Figure 8B:
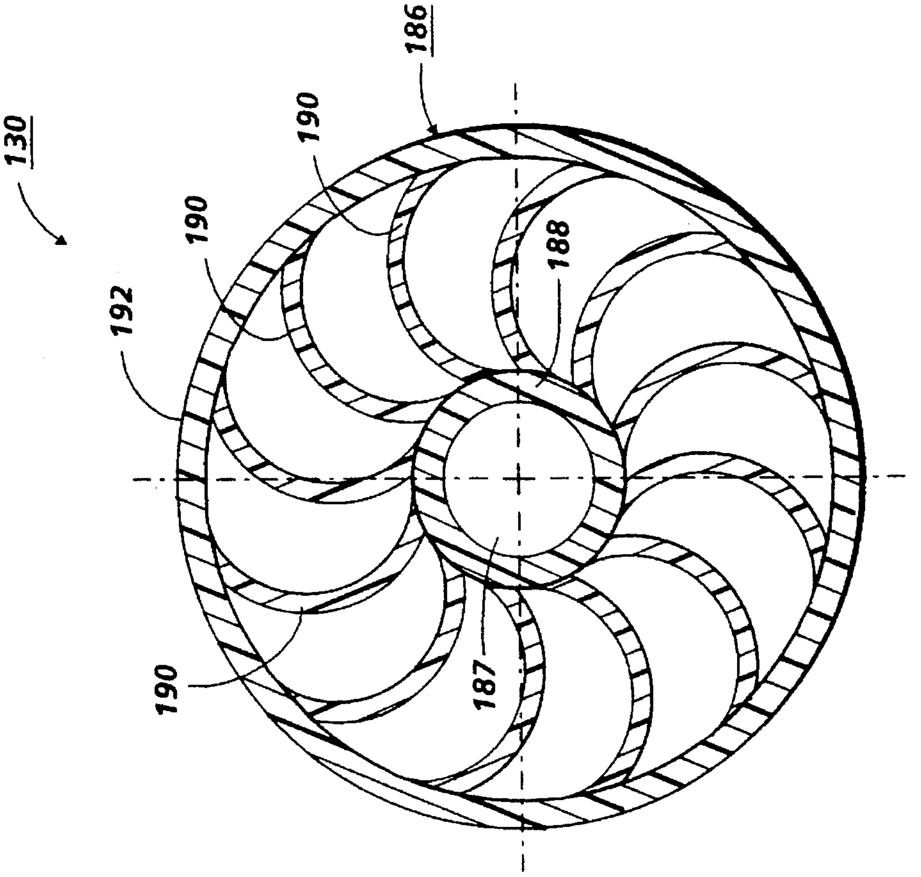
FIG. 8B is an elevational view of the charging roll of FIG. 8A.
Figure 8A:
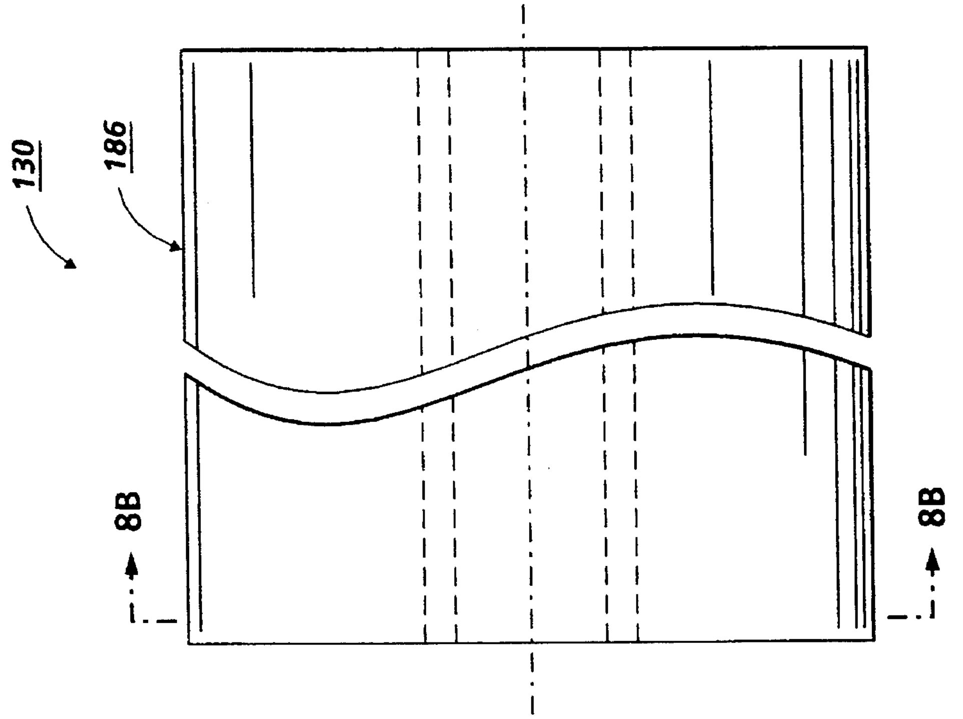
FIG. 8A is a plan view of a fifth embodiment of the charging roll of the present invention.

If the charging roller is made from an extrusion process, coextrusion, the extrusion of two or more different materials simultaneously extruded, would provide addition design flexibility. A coextruded charging roller 130 is shown in FIGS. 8A and 8B. The charging roller 130 includes a conformable body 186. The conformable body 186 is similar to the conformable body 86 of FIGS. 1A and 1B, except that the conformable body 186 includes a inner elongated cylinder 188, ribs 190 extending from the inner elongated cylinder 788 and an outer elongated cylinder 192 extending from the ribs 190. While the inner elongated cylinder 88, the ribs 90 and the outer elongated cylinder 92 of the conformable body 86 of FIGS. 1A and 1B are made from a solitary material, the inner elongated cylinder 188, ribs 190, and outer elongated cylinder 192 of the conformable body 186 may be each made from a different material. When using the coextrusion process each of the inner elongated cylinder 188, ribs 190, and elongated cylinder 192 may be extruded from a different material. The conformable body 186 similarly includes a central cavity 187 centrally located within the conformable body 186. With the extruding of different materials simultaneously, the inner elongated cylinder 188 may be made from a material with an electrical conductivity significantly greater than the conductivity of the materials used for the ribs 190 or the outer elongated cylinder 192. Thus, the materials for the cylinders 188 and 192 and the ribs 190 may be independently selected to obtain the optimum electrical conductivity for proper operation of the charging roller 130. For example, the inner elongated cylinder 188 may be made of a material containing a higher quantity of conductive material 194 such as carbon black than that found in the material utilized for manufacturing either the outer elongated cylinder 192 or the ribs 190. The charge roller 130, being made in a single process, can be manufactured inexpensively.

Figure 2B:
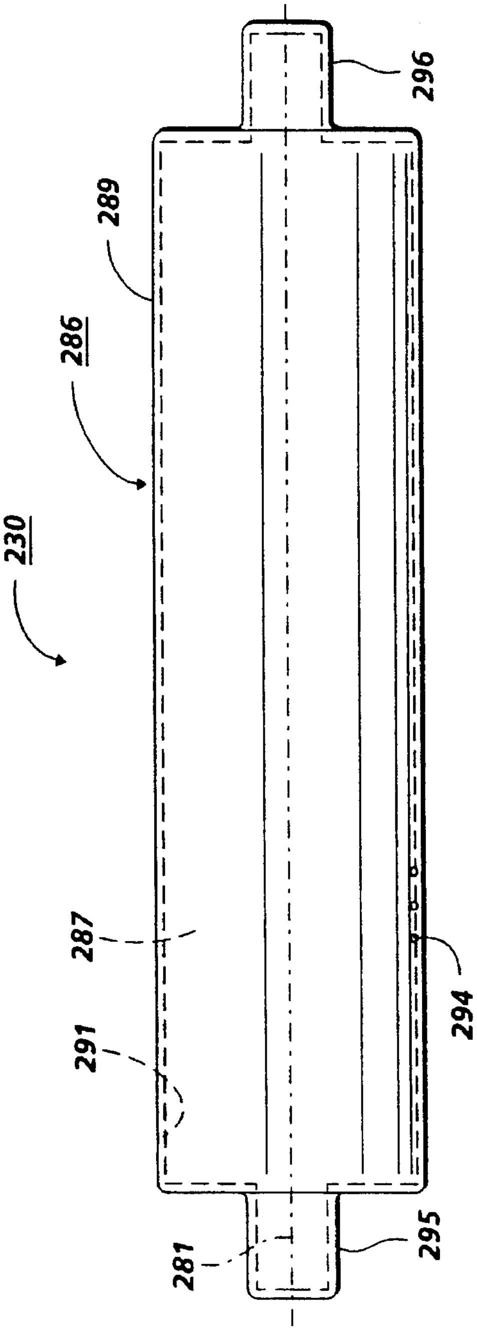
FIG. 2B is an elevational view of the charging roll of FIG. 2A.
Figure 2A:
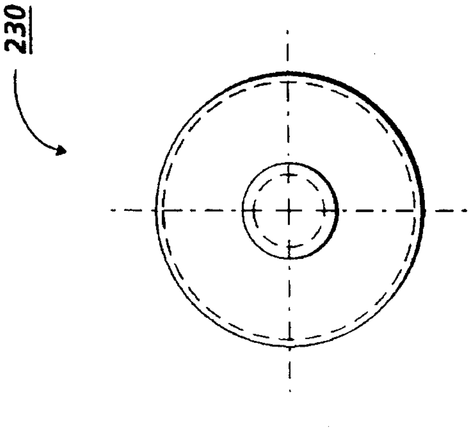
FIG. 2A is a plan view of a second embodiment of the charging roll of the present invention.
Figure 3B:
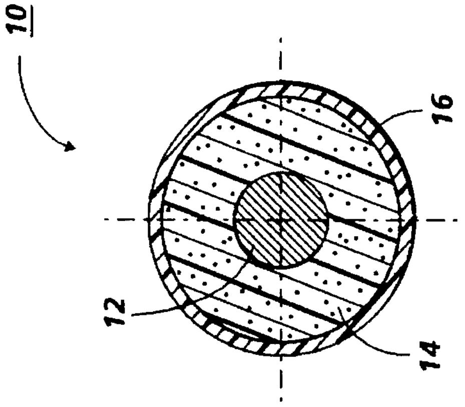
FIG. 3B PRIOR ART
FIG. 3B is an elevational view of the prior art charging roll of FIG. 3A.
Figure 3A:
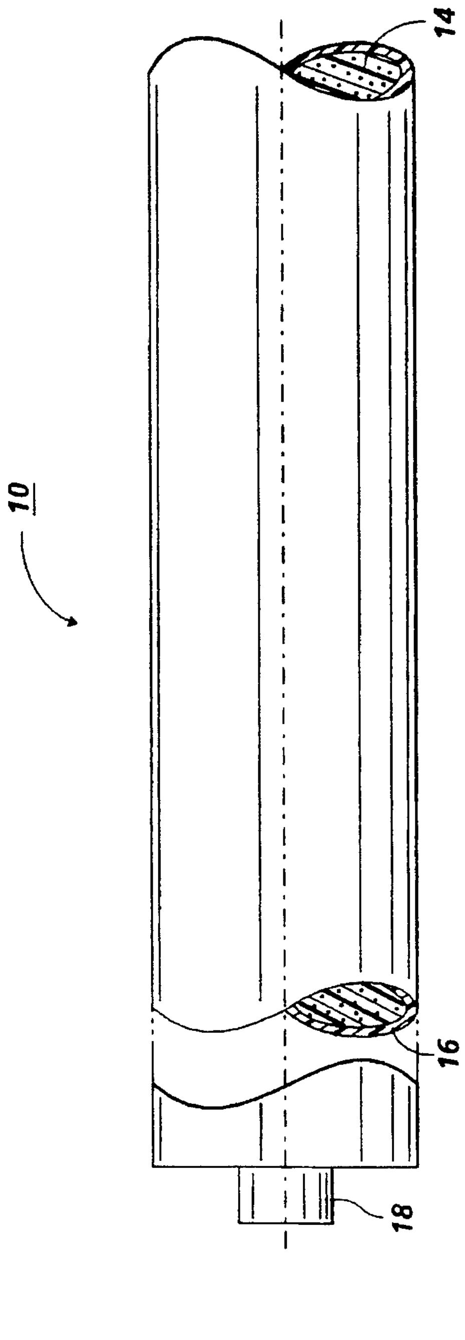
FIG. 3A PRIOR ART
FIG. 3A is a plan view of a prior art charging roll.

An alternate embodiment of the present invention is shown in charging roller 230 of FIGS. 2A and 2B. The charging roller 230 includes a conformable body 286 preferably in the form of a cylinder with a first and second hub 295 and 296, respectively, extending from the ends of the central cylindrical portion of the conformable body 286. The conformable body 286 is preferably manufactured by blow molding or rotationally molding the charging roller 230 about axis 281 of the body 286. The conformable body 286 includes an outer surface 289 and an inter wall 291 spaced therefrom. A central cavity 287 is located within the inner wall 291. The conformable body 286 is preferably made from a semi-conductive thermoplastic with a suitable modulus and suitable electrical conductivity. The distance between outer surface 289 and inner wall 291, defines the wall thickness. The material properties of the conformable body 286 are chosen so as to optimize the conformability of the charging roller 230. Again, as in the charging roller 30 and 130 of FIGS. 1A and 1B and FIGS. 8A and 8B, respectively, the charging roller 230 may include conductive material 294 such as carbon black to provide the necessary electrical conductivity for the charging roller 230. The charge roller 30, being made from single or multiple materials in a single process, can be manufactured inexpensively.

Figure 4B:
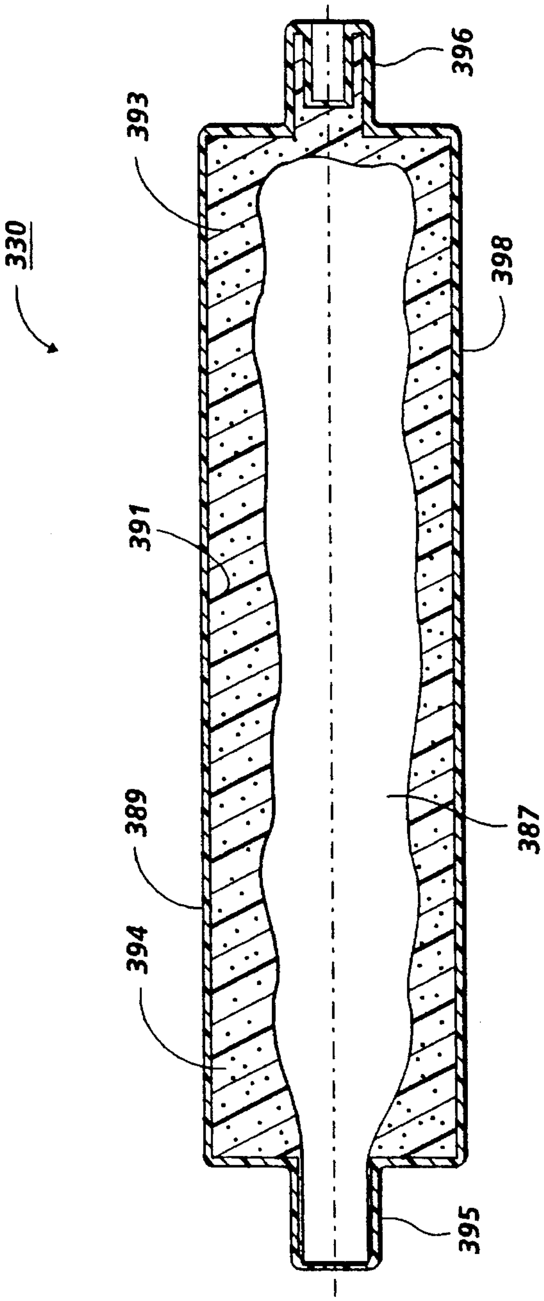
FIG. 4A is a plan view and FIG. 4B is an elevational view of a third embodiment of the charging roll of the present invention.
Figure 4A:
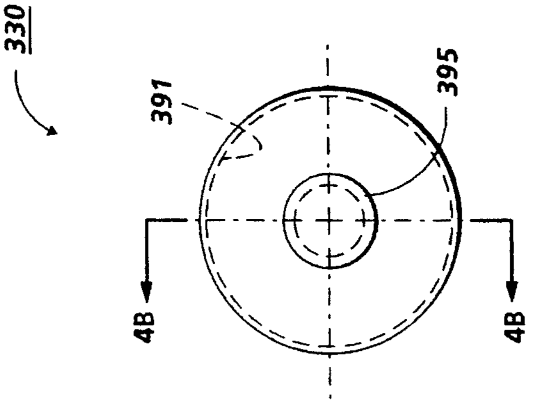

A third alternate embodiment of the present invention is shown in charging roller 330 of FIGS. 4A and 4B. The charging roller 330 includes a conformable body 393 having a generally cylindrical form, and first and second hubs 395 and 396, respectively, extending centrally from the ends of the conformable body 393. A central cavity 387 is located within the conformable body 393. Preferably, the charging roller 330 is manufactured from a gas assist blow molding process. The gas assist blow molding process produces a skin layer 398 having an outer surface 389 and an inner wall 391 on the outer portions of the conformable foam body 393. The charging roller 330 is manufacturing from a suitable material such as a suitable thermoplastic or thermoset elastomer or a non-elastomer material. The flexibility of the charging roller 330 is derived both from the hollow structure inherent in a roller having the central cavity 387 and from the material selected for the conformable body 393. Conductive material 394 such as carbon black may be included within the conformable foam body 393 and the skin layer 398 in order to enhance the electrical conductive property of the charging roller 330. The central cavity 387 of the charging roller 330 may contain either air or an inert gas under a pressure sufficient to obtain the proper conformability of the charging roller 330. The charge roller 30, being made from single or multiple materials in a single or co-molding process, can be manufactured inexpensively.

Figure 5B:
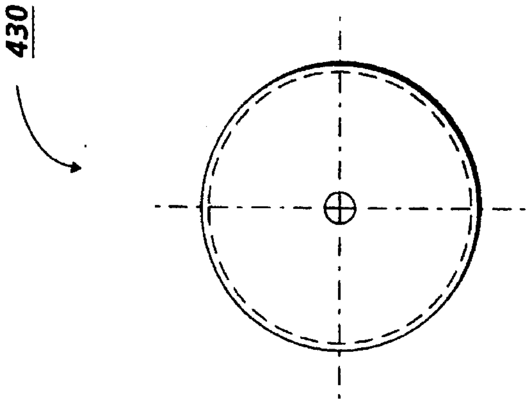
FIG. 5B is an elevational view of the charging roll of FIG. 5A.
Figure 5A:
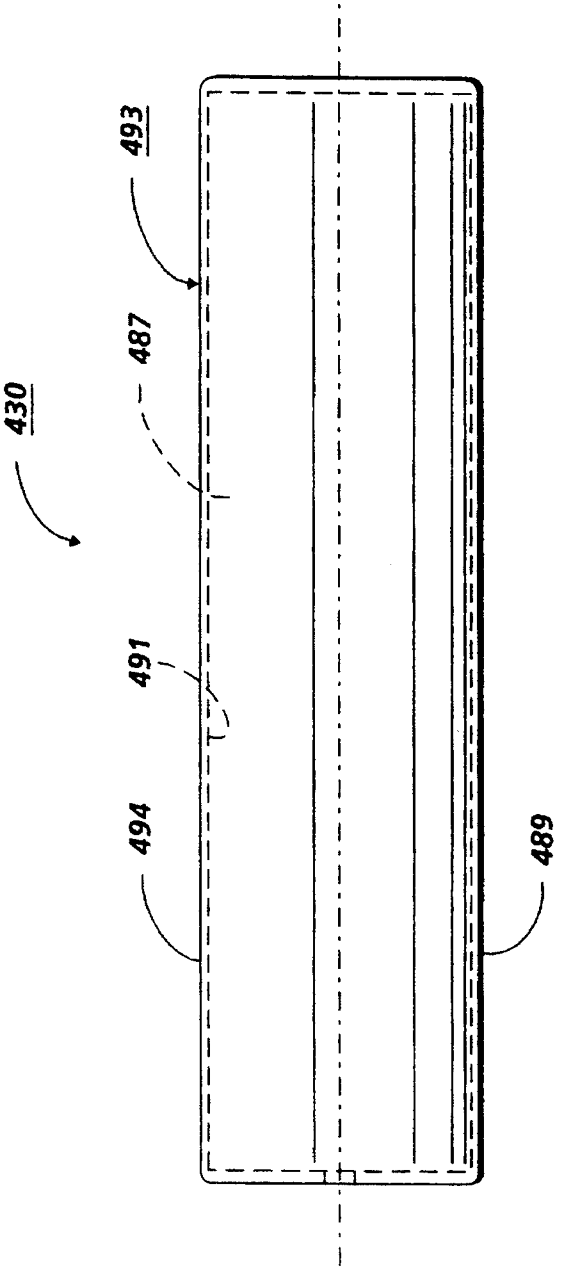
FIG. 5A is a plan view of a fourth embodiment of the charging roll of the present invention.

A fourth alternate embodiment of a charging roller according to the present invention is shown in charging roller 430 of FIGS. 5A and 5B. Charging roller 430 includes a conformable body 493 which is preferably in the form of a cylinder. The conformable body 493 defines a central cavity 487 therein. The conformable body 493 includes an inner wall 491 and an outer surface 489 defining a thickness therebetween. The conformable body 493 is preferably manufactured from an expandable material preferably in the form of a rubber or elastomer type material. The conformable body is filled with air or some other compressible material which provides the conformability of the charging roller 430. The conformable body 493 thereby is in the form of a conformable bladder. Similarly, the conformable body 493 may be made of a foam. The conformable body 493 may be manufactured by standard known processes such as those available to make a soccer ball or a basketball. The conformable body 493 may likewise be made from a suitable conductive thermoplastic or thermoset materials with elastomer or non-elastic materials. Conductive material 494, such as carbon black, may be used to enhance the conductive properties of the conformable body 493. The central cavity 487 of the charging roll 430 may be filled with air or some other compressible material under the proper pressure to obtain the suitable conformability for the charging roller 430. The charging roller 430 would be particularly inexpensive in that it would be made in a single step molding process with singular or multiple materials.

Figures 7A, 7B:
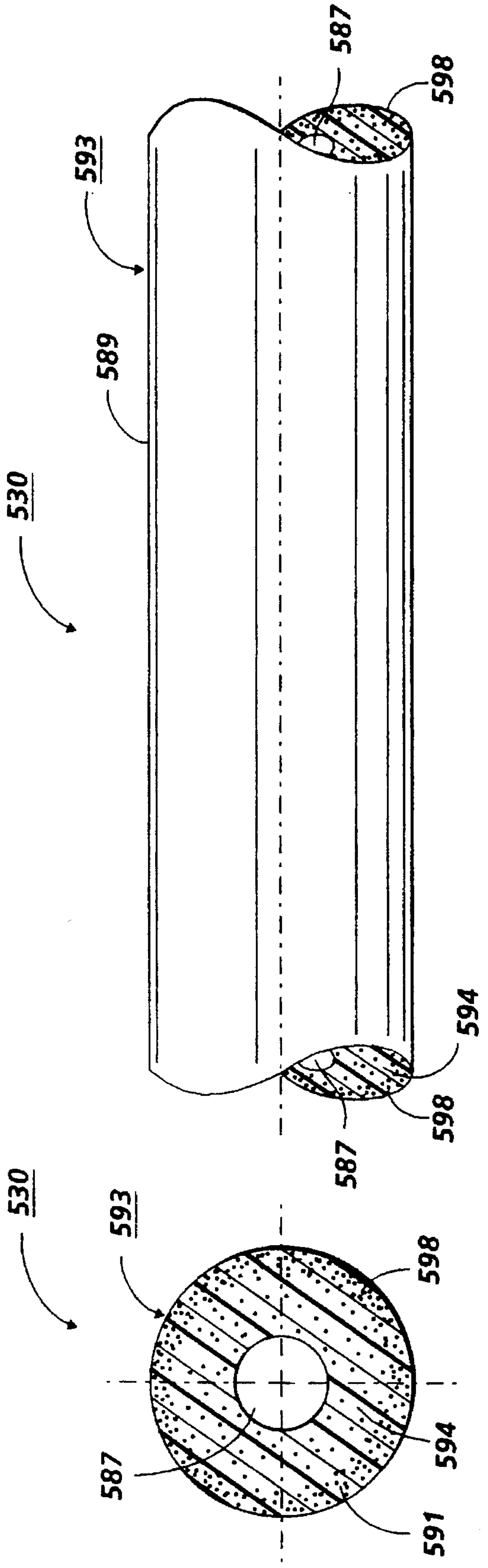
FIG. 7A is a plan view of a fourth embodiment of the charging roll of the present invention.
FIG. 7B is an elevational view of the charging roll of FIG. 7A.

A fifth alternate embodiment of a charging roller according to the present invention is shown in charging roller 530 of FIGS. 7A and 7B. The charging roller 530 includes a conformable body 593 having a generally cylindrical shape. The conformable body 593 is preferably made from an integral conductive foam that is manufactured by a suitable process such as molding. Preferably, the conformable body 593 is made from a material that is self skinning to provide a high density layer of skin 598 near outer surface 589 of the body 593. A transition zone 591 is thus formed between the body 593 and the skin 598 located thereupon. The skin 598 provides an improved wear resistant outer surface 589 for the roller 530. The body 593 may include conductive material 594 such as carbon black to improve the electrically conductive conductivity of the charge roll 530. The foam material for the body 593 is chosen to obtain the proper conformability, strength, and electrical conductivity necessary to provide an effective charge roller 530. A central cavity 587 is preferably located centrally within the body 593 of the charge roller 530. Since the charge roller 530 is manufactured from single or multiple materials in a single or co-molding process of molding, the charge roller 530 may be made very inexpensively.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A device for charging a member, comprising:

a roller contactable with the member to charge the member, said roller including a first elongated cylinder defining a central cavity therein and being flexible in a radial direction toward the central cavity, a second elongated cylinder located substantially within said first elongated cylinder and an arcuate rib interconnecting said first elongated cylinder and said second elongated cylinder; and means for electrically biasing said roller.

2. A device according to claim 1, wherein said roller comprises a molded plastic material.

3. A device according to claim 1, wherein said roller comprises an extruded plastic material.

4. A device according to claim 3, wherein said extruded plastic material comprises a plurality of plastic materials.

5. A device for charging a member, comprising:

a roller contactable with the member to charge the member, said roller including an elongated cylinder defining a central cavity therein and an inert gas located within the central cavity, said elongated cylinder being flexible in a radial direction toward the central cavity, said roller including a first journal and a second journal extending outwardly from said elongated cylinder and integral to said elongated cylinder; and means for electrically biasing said roller.

6. A device according to claim 5, wherein said elongated cylinder comprises a conformable material.

7. A device according to claim 5, wherein said elongated cylinder comprises an inflatable bladder.

8. A device for charging a member, comprising:

a roller contactable with the member to charge the member, said roller including a first elongated cylinder defining a central cavity therein and being flexible in a radial direction toward the central cavity, a second elongated cylinder located substantially within said first elongated cylinder and a rib interconnecting said first elongated cylinder and said second elongated cylinder, at least one of said first elongated cylinder, said second elongated cylinder and said rib having a different material than the remainder of said cylinders and said rib; and means for electrically biasing said roller.

9. A device according to claim 8, wherein said roller comprises a molded plastic material.

10. A device according to claim 8, wherein said roller comprises an extruded plastic material.

11. A device according to claim 10, wherein said extruded plastic material comprises a plurality of plastic materials simultaneously extruded to form said roller.

12. A device for charging a member, comprising:

a roller contactable with the member to charge the member, said roller including an elongated cylinder defining a central cavity therein and an inert gas located within the central cavity, said elongated cylinder being flexible in a radial direction toward the central cavity, said cylinder including a material having a first density adjacent the outer periphery of said roller and a second density adjacent the inner periphery of said cylinder, said first density being substantially greater than said second density; and means for electrically biasing said roller.

13. A device according to claim 12, wherein said elongated cylinder comprises a conformable material.

14. A device according to claim 12, wherein said elongated cylinder comprises a conductive foam.

* * * * *